United States Patent [19]

Chowning et al.

[11] 4,024,504

[45] May 17, 1977

[54] FIRMWARE LOADER FOR LOAD TIME BINDING

[75] Inventors: Patrick J. Chowning, Royal Oak, Mich.; Diane W. Cikoski; Thomas R. Cikoski, both of Downingtown, Pa.

[73] Assignee: Burroughs Corporation, Detroit, Mich.

[22] Filed: Dec. 21, 1973

[21] Appl. No.: 427,063

[52] U.S. Cl. .......................................... 340/172.5
[51] Int. Cl.² ................................................ G06F 3/00
[58] Field of Search ................................ 340/172.5

[56] References Cited

UNITED STATES PATENTS

| | | | |
|---|---|---|---|
| 3,646,522 | 2/1972 | Furman et al. | 340/172.5 |
| 3,713,107 | 1/1973 | Barsamian | 340/172.5 |
| 3,828,320 | 8/1974 | Dinerman et al. | 340/172.5 |
| 3,839,705 | 10/1974 | Davis et al. | 340/172.5 |

Primary Examiner—Jerry Smith

Attorney, Agent, or Firm—Kevin R. Peterson; Edmund M. Chung; Leonard C. Brenner

[57] ABSTRACT

A loader which itself may be implemented in firmware, being permanently resident within a read-only microinstruction memory in a microprogrammable digital processor, or which may be implemented by a hardwired digital logic equivalent, is provided for binding the firmware structure of such microinstruction processor at user-program, load-time. This loader is preferably activated by the loading operation to read the loaded program's operating requirements and to equate these to system requirements and to firmware controller requirements. The loader may then call upon a library of firmware which may be optionally incorporated into the system, to select the specific firmware modules which are needed to execute that particular program, and to bind the selected firmware into the processor's microprogram read-write memory.

7 Claims, 13 Drawing Figures

_Fig. 4_

_Fig. 5_

FIRMWARE LOADER FOR LOAD TIME BINDING

CROSS REFERENCE TO RELATED APPLICATION

In copending application Ser. No. 825,569 for "Polymorphic Programmable Units Employing Sub-Instruction Sets" filed May 19, 1969 in the name of Faber et al there is described a microprogrammable data processor environment for which the present firmware loading invention was developed.

BACKGROUND OF THE INVENTION

Many problems exist when dealing with and or designing small processors of the mini-computer size that don't occur with larger systems. A major problem which must be dealt with constantly is the one of storage capacity or memory size. In a mini-computer, such as a Burroughs B700, there very often is a limited memory storage capacity which must be utilized with efficient discretion so as to permit a maximum amount of storage for user programs and data.

One approach has been to combine microinstruction storage and user code storage into one large or shared memory unit. With this storage arrangment, memory space not used for microinstruction storage may be used for user code. Typically, such shared memory apparatus have the capability for and do keep microprogram memory separate from data or source level memory.

Immediate benefits are bestowed by use of a shared memory in which the boundary separating microprogram storage and user code or S-level storage is movable. Microprogram and S-level memory space may therefore be adjusted as the requirements of the system change, and trade-offs are made to meet a specific application.

It is therefore desirable to have a machine wherein the amount of firmware structured into the machine is only the amount needed to offer the processor capabilities needed to run the user program. Such a machine would require a minimum of microprogram storage space thus freeing more of the shared memory for use by the programmer in running his object program and storing needed data values. This feat may be accomplished by the load time binding of firmware.

With this type of apparatus design considerations occur which do not occur in binding at source language levels. Unlike run time binding of object program definitions and/or program subroutines, load time binding deals with the structuring of system firmware at a time when the user has loaded his object program. This design approach necessitates the construction of a library of all possible firmware modules which may be needed at some time in the operation of the system.

it is therefore desirable that for a given user program the processing system automatically decide what firmware controllers are needed to run the program. It is further desirable that decisional apparatus exist within the processor for loading firmware modules and that the loader be economically reconfigurable by an engineer.

An object of this invention is to provide a loader for a microprogrammable digital processor which is always resident or in existance in the processor, for loading firmware controllers into said processor at user program load time.

Another object of the invention is to provide a loader to which changes may be economically made given the microprogram environment of the processor.

A further object of the invention is to provide a loader which is capable of deciding what firmware modules are to be bound into the system processor (interpreter) to operate upon the particular user program entered.

SUMMARY OF THE INVENTION

A firmware loader is provided which may be utilized to bind the firmware structure of a microprogrammable digital processor at load time. Such a firmware loader could be permanently resident in the processor system as a fixed component of the base or host machine structure. The loader could be activated by a user-programmer's loading of a software program containing, for example, a key word code.

A collection or library of all peripheral and computational firmware prepared for the system may be stored on auxiliary storage including a directory of each micro-string name and corresponding auxiliary storage address.

Typically, when a user program containing header information is loaded into system a detector recognizes the code and initiates the firmware load operation. A decoder may then decode header information to obtain a table of firmware modules required in the system to perform the loaded user program.

This operation being completed, the required firmware microstrings may then be bound into shared memory locations from auxiliary storage.

During binding, reference addresses within each firmware moldule may be translated to reflect their new location after being loaded into memory

DESCRIPTION OF THE DRAWINGS

The features of this invention as well as the invention itself can be obtained from the following description taken in connection with the accompanying drawings in which like characters refer to like parts and in which:

FIG. 8 (comprising FIGS. 8a–8e) is a flow diagram for the firmware loader.

DETAILED DESCRIPTION OF INVENTION

DEFINITIONS

Certain terms are used frequently in the following specification and are to be interpreted as follows.

Program language form: is any format which may be encoded into binary signals which format may be employed by a programmer or computer user without any knowledge of the circuitry in a specific processing system.

S-level instruction: is an instruction containing information specifying a routine or process to be carried out on data sets. An S instruction is comparable to a macroinstruction or source language instruction of prior art.

M-level instruction: is an instruction containing information specifying an operational command to be carried out in a processing system where one or more such operations are required to carry out a process called for by the S instruction. An M instruction is comparable to a microinstruction employed in the prior art.

N instruction: is an instruction containing information specifying particular control signals which are to be employed within the processing system to activate the implementation of an M instruction. One or more N instructions may be required to implement an M instruction.

DESIGN APPROACH

In microprogrammable processors, firmware is by definition an integral part of the design structure being part and parcel to the apparatus. Without microinstructions the microprogrammable processor is inoperable. The addition of firmware to a microinstruction computer completes the machine's design.

Firmware, as defined by Opler, the individual who coined the term, Datamation, January 1967, pp 22-24, designates microprograms resident within the control memory of microinstruction computer which completes the logic design of that machine for a specific application. Firmware therefore, must, in each case, be constructed for compatability with an existing machine structure just as hardwired amplifiers and filters, etc., are constructed for compatability with existing machine structure. Firmware becomes an optimal medium of design for the engineer. It is another configuration by which subsystem tasks are performed within a computer system. As with a hardware counterpart in which it is not the individual resistor, capacitor, logic gates, etc., which are the invention, but the resulting module constructed by a specific interconnection of resistors, capacitors, logic gates, etc.; with firmware it is not the individual microinstruction which is the invention but the microprogram constructed by a specific interconnection of microinstructions.

In designing a processor the engineer must evaluate his design requirements and decide how to approach the task of each component within the system. Sometimes a firmware design is utilized, at other times it may be the use of digital logic, analog circuitry, passive circuitry, active circuitry, filters, multiplexors, etc. In each case the choice involves trade-offs as to speed, cost, versatility, capacity, weight, etc. Storage of both macroinstructions and microinstructions in the same memory is a growing concept in microinstruction processor design. A relevant example of the shared memory concept is disclosed in U.S. Pat. No. 3,828,320 issued Aug. 6, 1974 to B.B. Dinerman et al and assigned to the assignee of the present invention. The use of a shared memory permits more economical memory sizing and a savings in memory addressing hardware but introduce additional storage capacity considerations. It is recognized by the industry that in microinstruction machines, where individually specified macroinstruction steps are accomplished by a string of microinstructions called for by the macroinstruction, the microinstruction capacity of the machine is not always fully utilized in the running of every program. This becomes increasingly more the case as the machine design incorporates the use of more and more microinstruction modules commonly called firmware modules as replacements for the traditional hardwired controllers. A typical machine having the peripheral capabilities of tape, disk, printer, reader and operator console units in which the controllers of these units are structured as firmware modulus will have a significantly increased amount of firmware over earlier generation machines. Add to this increased amount of peripheral firmware the basic firmware structure of the central processor, and the optimization of microinstruction storage in a shared memory becomes an important consideration. It is an obvious conclusion that the elimination of unneeded microinstructions from shared memory storage frees additional storage space for user program instructions (s level instructions) and data words.

The "load-time binding" of computer firmware therefore permits optimization of shared memory space and is a significant improvement over "run-time binding", as taught by the prior art, for application in microinstruction processors utilizing shared S-level and M-level memories. "Load-time binding" is the loading of the firmware needed to process a particular user-program at the time that user-program is loaded. It facilitates the loading of the minimum amount of microinstruction needed to run the program which automatically frees the greatest S level storage space in shared memory for storage of data.

This method of shared memory, storage allocation may be accomplished by a firmware loader. The design of such a loader as with all systems components, is specific to the environment in which it must operate and may be implemented by digital logic circuitry or by a fixed-residence firmware module.

MICROPROGRAMMABLE PROCESSOR ENVIRONMENT

The present invention operates in a microprogrammable computer which employs three separate instructional systems namely; the S level, M level and N level instructions. A roster of N instructions (nano instructions) is normally fixed in a read-only memory. The roster of M instructions may be changed dynamically with these instructions normally being stored in a read-write memory. The roster of S instructions including data is loaded by programmer operation and is stored in read-write memory.

The computer system in which the invention operates is taught by Faber, Polymorphic Programmable Units Employing Plural Levels of Sub Instruction Sets, U.S. Ser. No. 825,569, U. K. Pat. No. 1,318,231, U. K. Pat. No. 1,318,232, U. K. Pat. No. 1,318,233, U. K. Pat. No. 1,318,234, Mar. 27, 1973, Belgium Pat. No. 750,068, May 5, 1970 and French Pat. No. 7,016,550, Mar. 1, 1971. The manner in which the present invention is implemented will be better understood from a review of the drawings in connection with the following discussion.

Figure 1:
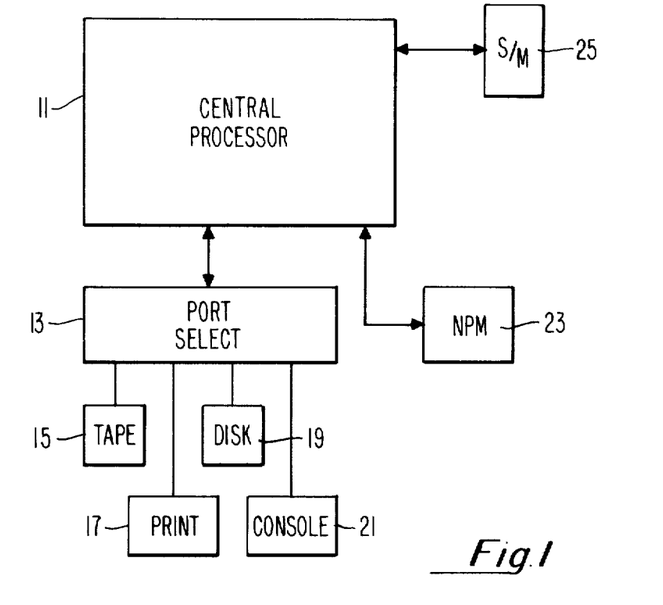
FIG. 1 is a block diagram of a microprocessor system in which the loader will operate.

FIG. 1 is a block diagram of the computer system in which a programmable central processor 11 is interfaced by a port select unit 13 to communicate with peripheral devices such as a tape unit 15, a printer 17, a disk unit 19 and an operator console 21 via the port select unit 13. Programmable central processor 11 also has connected to it a nanoprogram memory 23 for storing nano instructions, and a shared memory 25 for storing both S level instructions and M level instructions. Both memories may be of solid state type or random access disk type; however, N memory 23 inherently will be chosen to be of the type having the fastest memory cycle. Shared memory 25 is normally of the non-destructive readout type or NDRO while nano memory 23 is preferably of the read-only memory type ROM but may be NDRO.

Figure 2:
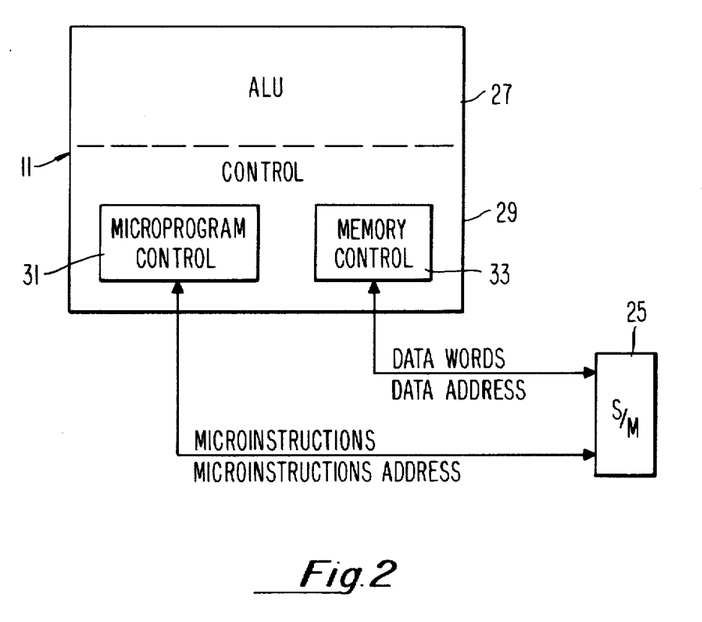
FIG. 2 is a block diagram showing the system of FIG. 1 in more detail as to processor and shared memory interconnection.

The programmable processor 11 is formed of two basic sections as shown in FIG. 2, namely an arithmetic logic unit 27 or ALU and a control section 29. As part of the memory control 29, a microprogram control unit 31 is connected to the shared memory 25 for addressing microinstruction locations and reading microinstructions from the memory 25. A memory control unit 33 is connected to the shared memory 25 for performing similar functions with respect to data words.

Figure 3:
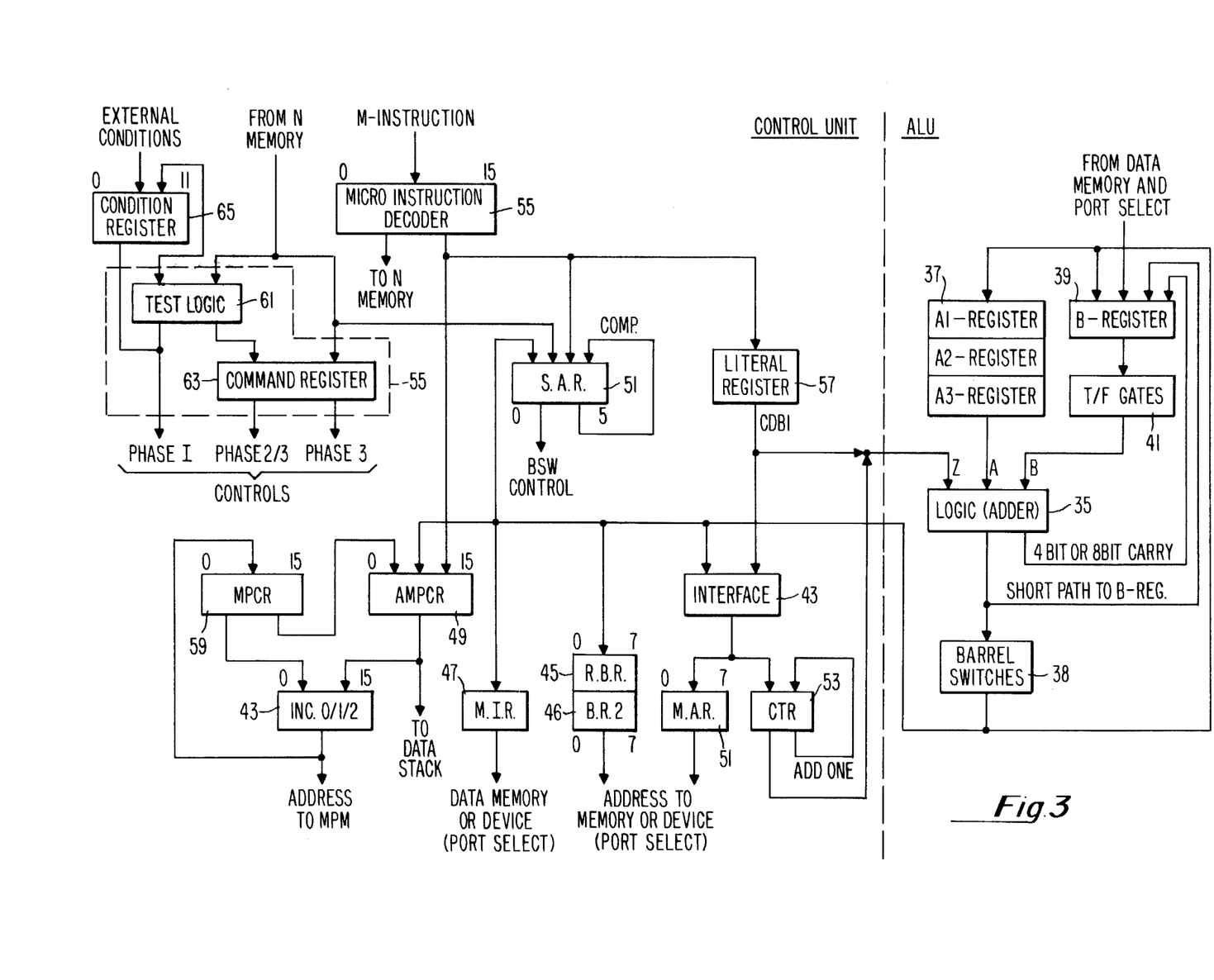
FIG. 3 is a more detailed diagram of the central processor of FIGS. 1 and 2.

The principle registers and data paths of both the control section 29 and the arithmetic unit 27 are shown in FIG. 3. The ALU 27 includes logic unit 35, which serves among other thinss as an adder, a barrel switch 37 connected to the output of the logic unit 34, and A registers 37 connected in a feedback between the output of barrel switch 37 and an input to logic unit 35. Also included are B register 39 and true-false gates 41 tied in series, respectively, the serial connection being connected to parallel feedback loops from the four or eight bit carry of logic adder 35, from the output of barrel switch 37 and from the output of logic unit 35. An additional input comes from the S level memory of shared memory 25. The output of the serial connection, i.e. from true-false gates 41 feeds the logic unit 35.

B register 39 is the primary interface between the programmable unit 11 and memory 25. This register also serves as the secondary input to adder 35 and serves certain secondary functions associated with the arithmetic operations.

True-false gates 41 serve to provide the true contents of B register 39 or to provide the one's complement of the contents of the register 39.

A registers 32 are three functionally identical registers. Each of the A registers 37 is loaded from the output of the barrel switch 38.

Control section 29 includes an area to provide an interface between the ALU 27 and the memory 25 and peripheral devices, an area to handle the decoding of M instructions and an area to receive and route N instruction control signals.

The output from the ALU 27 is from barrel switch 37 and may be supplied to interface 43, base registers 45 and 46 and a memory input register 47 as well as to an alternate microprogram counter register (AMPCR) 49. The output of barrel switches 38 may also be supplied to a shift amount register (SAR 51.

Interface gate 43 serves to receive addresses and other information for transfer either to a memory address register 51 or to a counter 53. The register base register (RBR) 45 contains the base address of a 256 word block of main memory, and with the contents of MAR 51 stores the complete memory address. Associated with RBR 45 is Base Register 2 (BR2) 46 which may contain the base address of a 256 word block of main memory or the most significant part of a device address. Memory information register (MIRO) 47 is used to buffer information being written to the main memory or to a device.

The contents of a microinstruction are received by a microinstruction decoder 55 to address the N memory and for transfer to literal register 57, shift amount register (SAR) 51 and to alternate microprogram count register (AMPCR) 49. The shift amount register 49 holds either the shift amount count or the word length complement thereof to be employed in controlling the number of bits by which data is shifted in barrel switches 37. The alternate microprogram counter register 49 contains the jump or return address for program jumps and subroutine returns within M programs. The address in this register 49 is usually one less than the position to be returned to. This register 49 can be loaded from microprogram count register 59, from the output of barrel switches 37 or from microinstruction decoder 55. In association with this register is the microprogram count register(MPCR) 59 which is the instruction address counter for the M portion of memory 25. It usually contains the current M instruction address.

The N instruction decode is performed by test logic circuitry 61 and a command register 63. The test logic circuit 61 receives information from condition register 65, the contents of this latter register being a set of testable bits which act as error indicators, interrupts, local and global Boolean variables and lockout indicators.

The memory and device operations are used to transfer data between the programmable unit 11 and memory 25 or some of the peripheral devices 15, 17, 19, 21. The programmable unit 11 is connected to the memory modules and devices through switch interlock bidirectional busses. Memory and device addresses are sent from the memory address register (MAR) 51, memory input register 47 and base register 46 via these busses.

As indicated above, implementation of M instructions by nanoinstructions occurs during three time phases. Thus, the control signals designated by the N instruction are segregated into three groups: phase 1, phases 2 and 3, and phase 3. Phase 1 is used for condition testing, next instruction address computation, initiation of memory and device operations, loading instruction literals into the LIT 57 or SAR 51 and setting up for a logic unit operation. Phase 2 is used to delay phase 3 for carry propagation, instruction buffering, instruction modification and microinstruction execution. Phase 3 is used to perform the logic unit operations including destination selection.

LOADER FUNCTION

The loader function includes detection when a user program has been entered into the computer system and determination of peripheral apparatus is needed in the running of that program. Once this task is decided, instructions may be fed to the processor to load the firmware controllers for operating each of the needed peripherals. To this end, a control card or header instruction is inserted at the beginning of each program which is loaded into the machine. This instruction includes a flag or key, and a list of code words defining each of the specific firmware modules used in the running of the program. A more detailed discussion of the header instruction will be discussed below.

The relationship of the loader may be one of monitoring programs or data entered into the processor and, when a program is entered and a determination is made of the firmware modules needed, may be one of binding the necessary firmware into memory.

Figure 4:
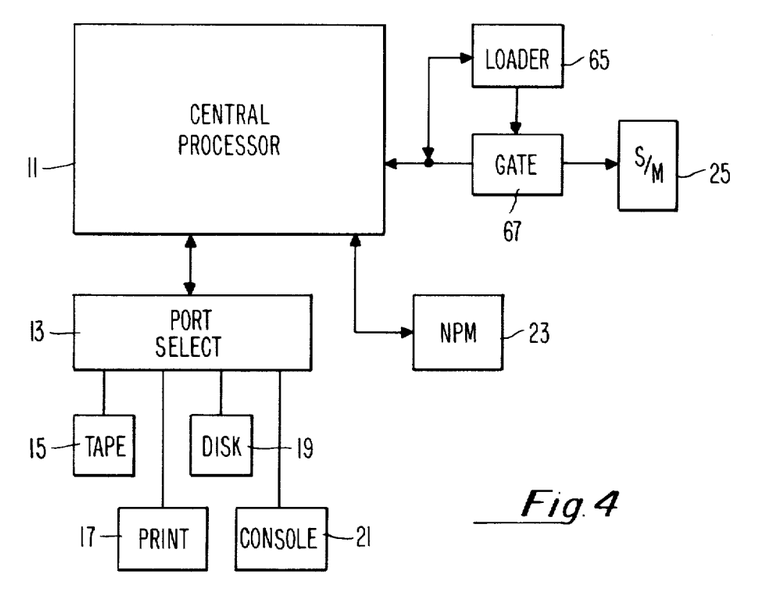
FIG. 4 shows the loader interfaces with the system of FIG. 1.

Such a loader when implemented, may as shown in FIG. 4, be tied to the information bus between the processor units 11 and the shared memory 25. Loader 65, when connected to this bus, can monitor input information and can have control of a gate 67 which can operate to block the firmware specification information from memory 25 storage. Loader 65 may then operate as directed by the firmware specification information to overlay or compile the firmware into memory 25.

Figure 5:
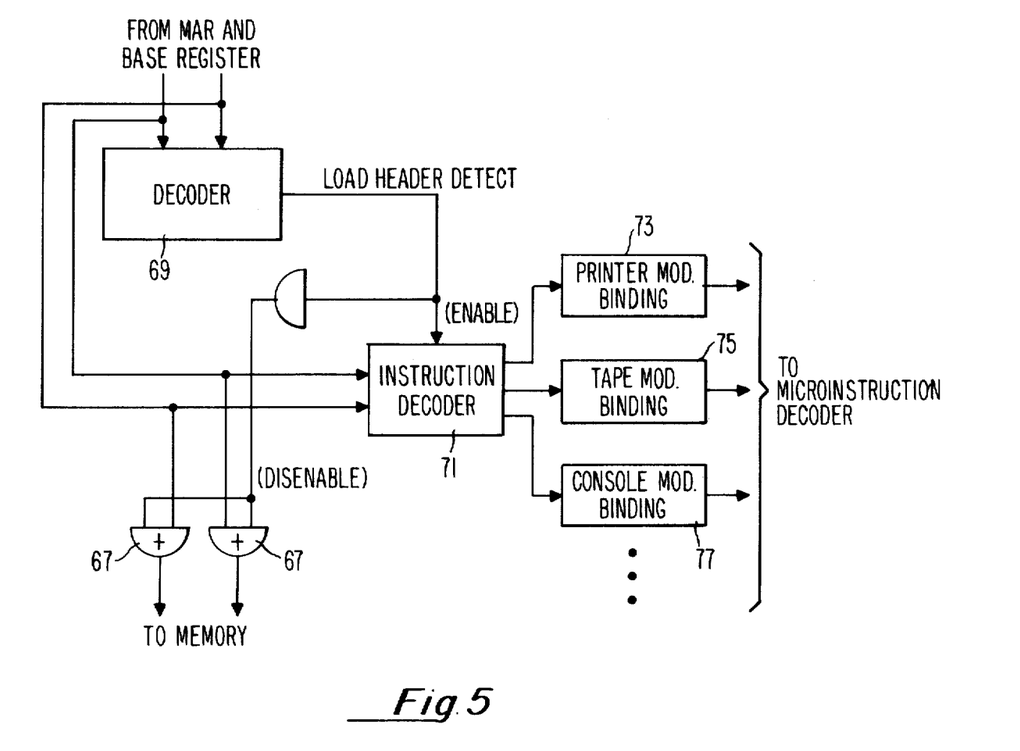
FIG. 5 shows a more detailed diagram of a hardware machanization of the loader.

FIG. 5 shows this loader 65 in more detail. A decoder 69 monitors program code for detection of a firmware specification information code word inserted at the head of each program. When this is detected the output form decoder 69 enables instruction decoder 71 and disenables "and"-gates 67 which are in the direct information bus from the processor 11 to the memory 25. Firmware specification information from the processor 11 is then decoded by decoder 71 which in turn enables a plurality of compile command generators such as, printer controller binding 73, tape controller binding 75 and console controller binding 77 etc. These generators 73–77 etc. are each connected to processor 11, miroinstruction decoder 55 and generate a predetermined fixed microcode calling for the loading of a particular firmware module into memory. An end of firmware specification signal resets the loader.

Alternatively the loader as discussed above may itself be implemented in firmware instead of hardware. Such a loader would be stored in a read-only portion of memory and be permanently resident within the computer. A primary advantage of this mechanization of the loader over the hardware one would be cost. Another advantage would be ease of implementation and reimplementation within a computer system which already has its control structure in firmware.

Figure 6:
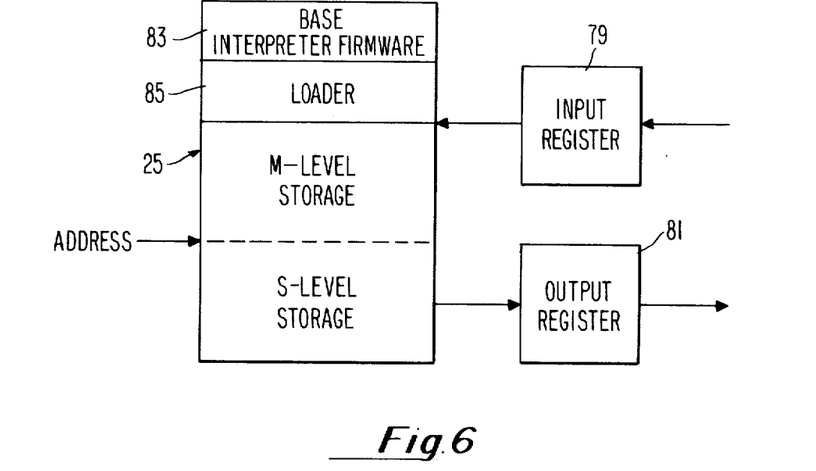
FIG. 6 is a representation of the shared memory of FIG. 1 with a firmware mechanization of the loader resident therein.

The preferred embodiment of the invention is a firmware-implemented loader which is permanently resistent in the base machine structure of the micropro- grammable digital computer. Such a loader and system would have the configuration as shown in FIG. 6 and as described as follows.

A central processor 11 contains the base machine hardware. A discussion of this hardware was given above. Connected to central processor 11 may be a number of port select units 13, each having a number of ports such as four, for interfacing various peripheral devices with the processor 11. These peripheral devices may be tape unit 15, printer 17, disk pack 19 and operator console 21. A read-only nano program memory 23 is tied to central processor 11 and contains all nano-instruction words basic to the machine. Also connected to the processor 11 is a shared memory 25. Part of memory 25 is input register 79 and output register 81.

Part of memory 25 is base interpreter firmware 83. This firmware is resident within a read only portion of memory 25 and together with the processor 11, which as described and referenced above is commonly termed in the art as base interpreter hardware, comprises the interpreter structure of the microprogram system. The interpreter firmware 83 defines the basic interfaces and control sequences specific to the interpreter.

Loader firmware 85 is resident within a read-only portion of memory 25. This loader comprises a plurality of microinstruction programs for loading peripheral firmware and interpreter computational firmware into M level storage when a user-program, containing header information, is loaded into the computer system.

All available peripheral controllers (firmware moldules) and interpreter (processor) computational firmware not basic to initial load operations are stored in library form in auxiliary storage such as disk. Each firmware module has a fixed library address including disk number and track number and is stored with all internal program indexes normalized to the beginning of the program.

Figure 7:
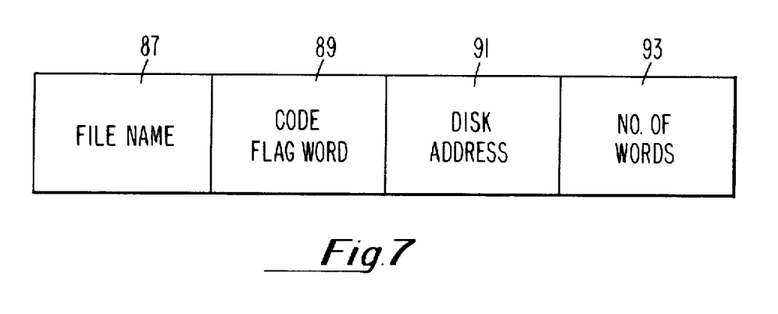
FIG. 7 is a representation of header information needed by the loader in either form.
Figure 8A:
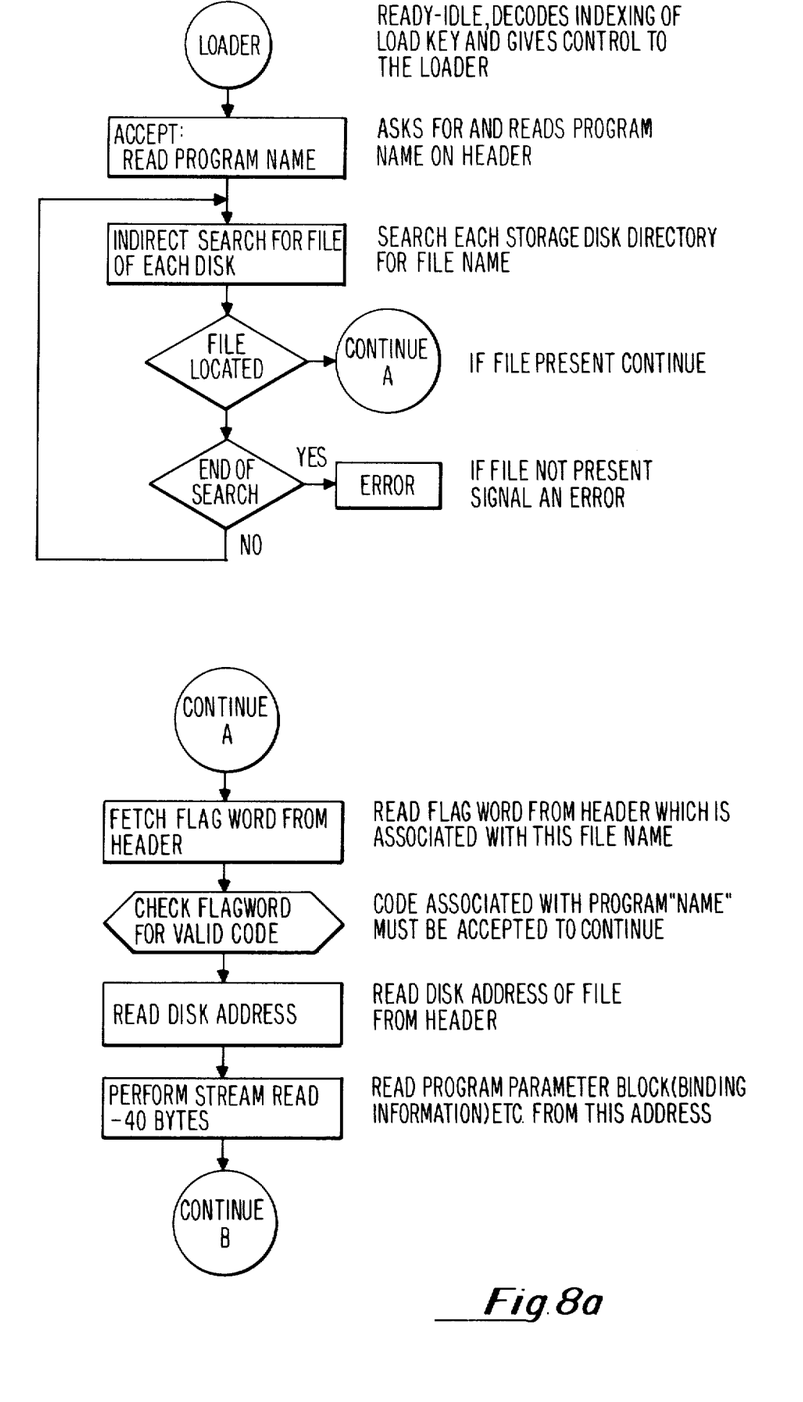
Figure 8B:
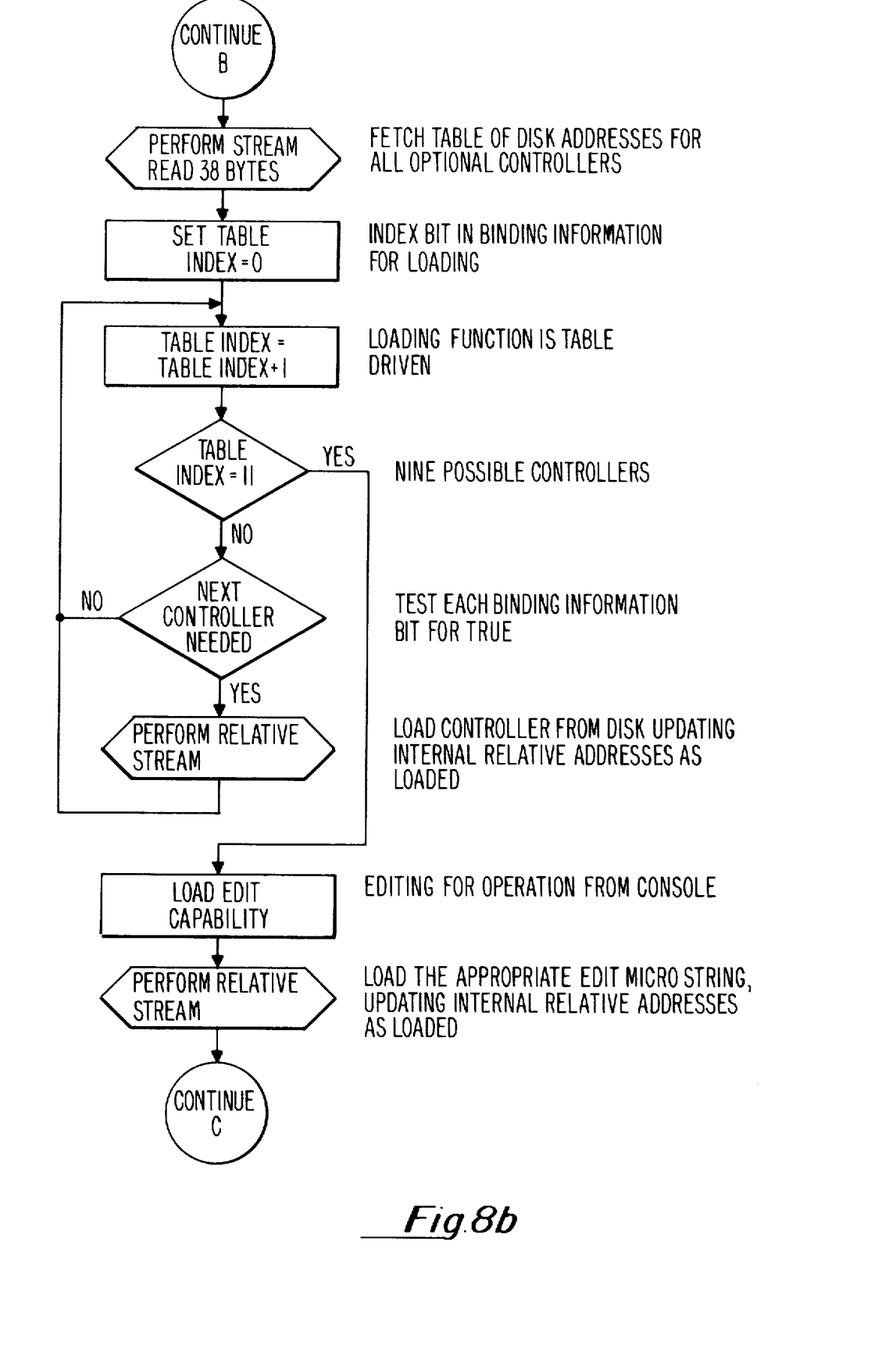
Figure 8C:
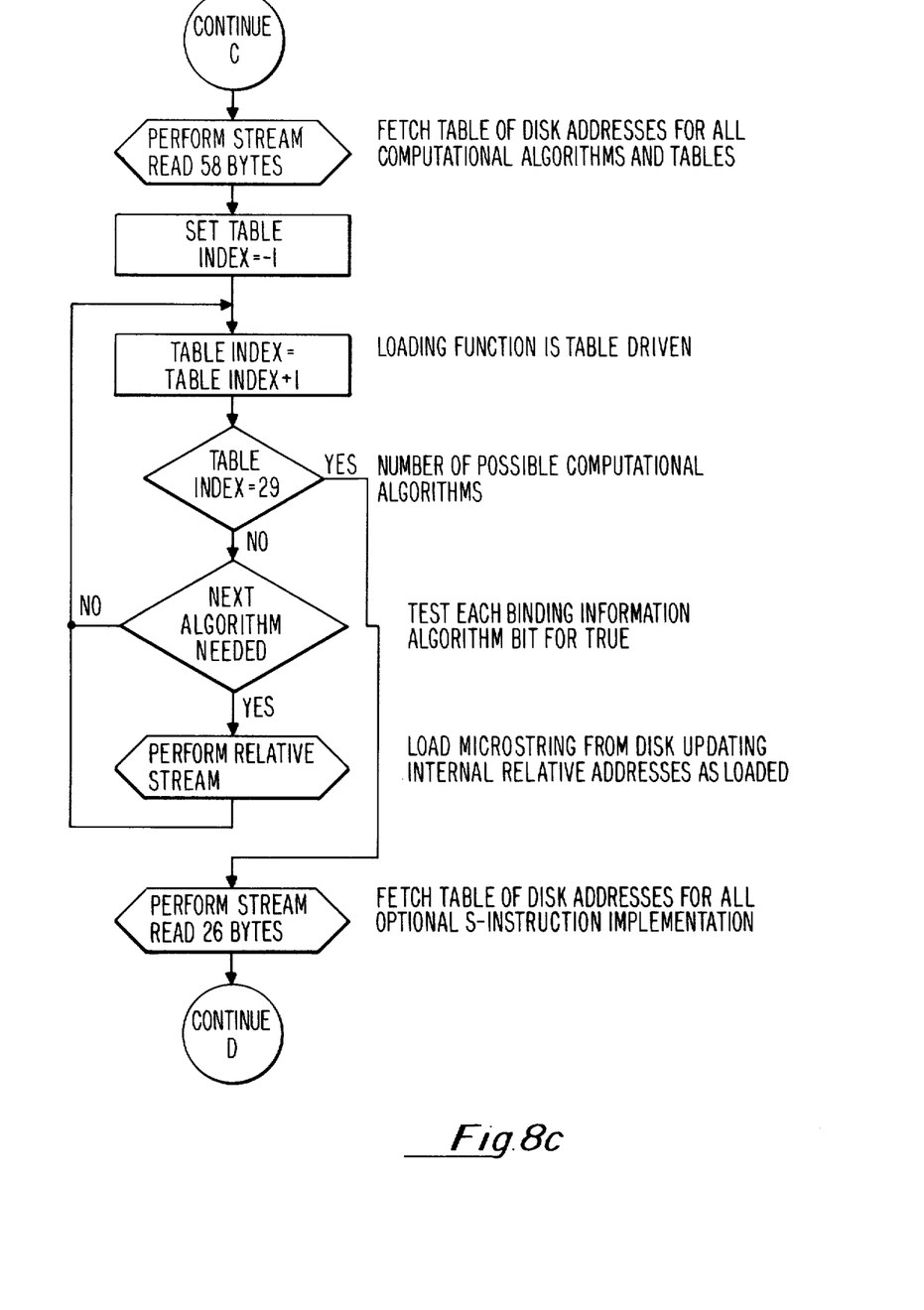
Figure 8D:
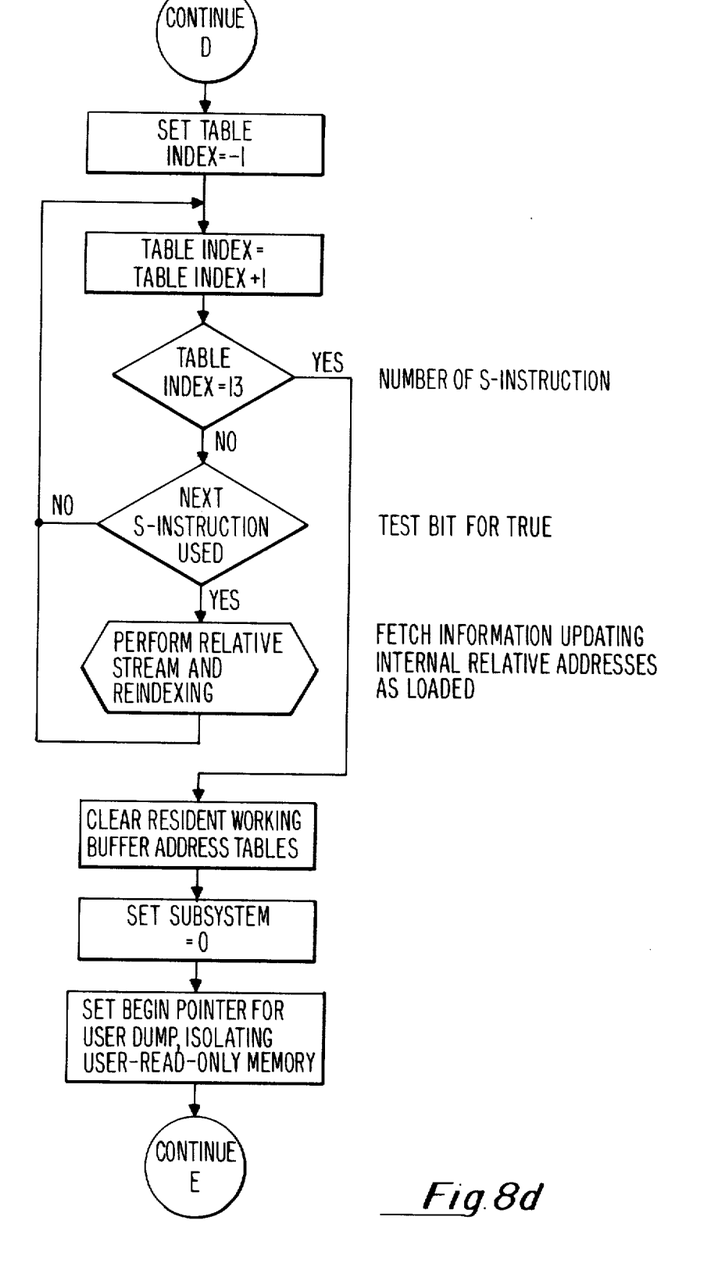
Figure 8E:
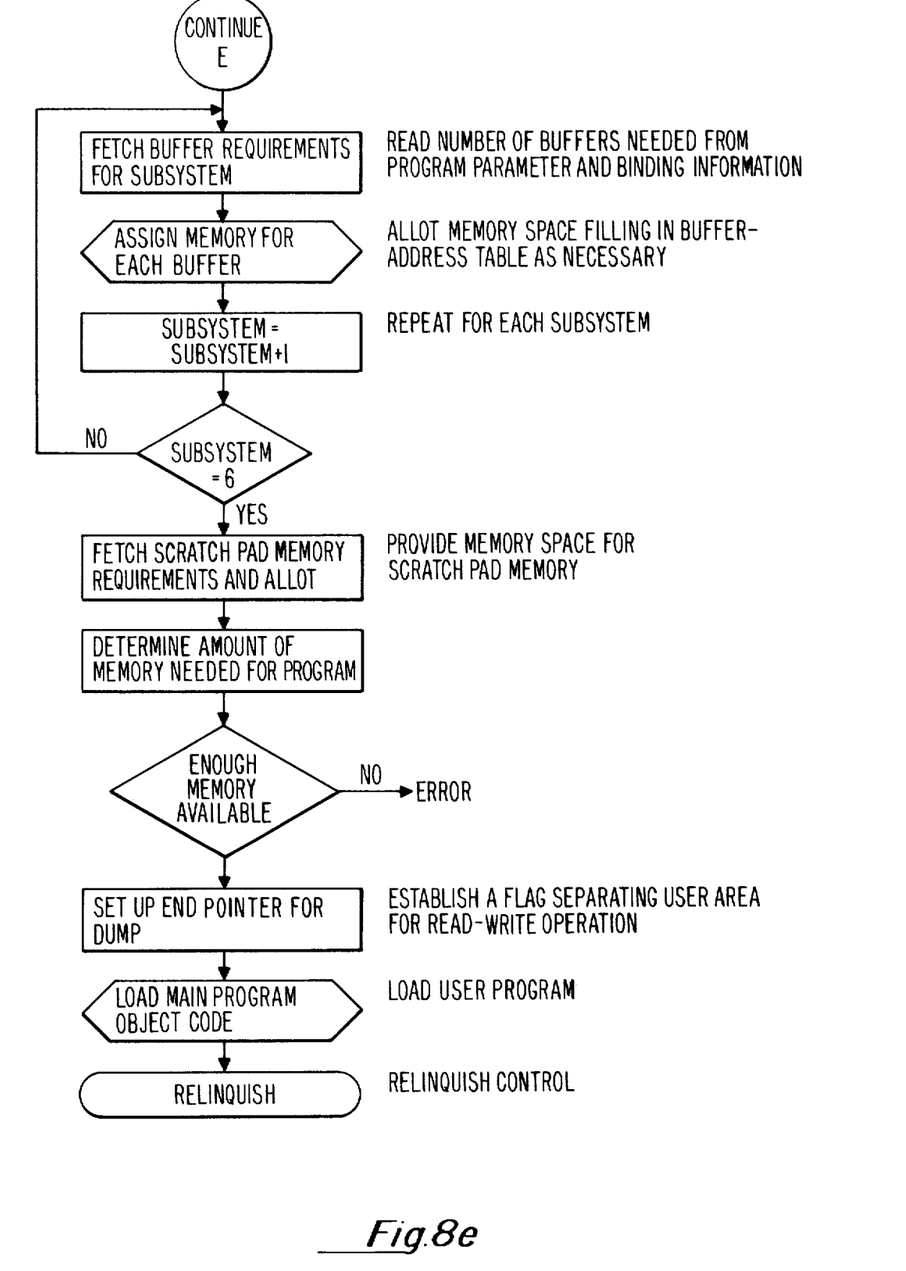

The header information loaded at the beginning of the user program contains instructions for the loader. Included in this information, as shown in FIG. 7, is file-name 87, a loader interlock code word 89, an address, such as auxiliary disk storage address 91 at which binding information for the particular program loader is stored, and the number of words 93 reserved for the user program. FIG. 7 is a representation of a typical 80 or 96 column card having this header information. The first field of 10 hexadecimal digits is reserved for program name 87. The second field of four hexadecimal digits is reserved for the code flag 89 word which signifies the named program to be entered and interlocks loader information if it is not correct. The third field of four hexadecimal digits is used for the disk location 91 of the user program file which contains the binding information. While a fourth field of four hexadecimal digits specifies the length 93 of the user program to be loaded. The file name references a parameter block containing binding information for that particular program. This binding information is contained in a field of twenty bits, wherein each bit position represents a different firmware module. By using a 1 for present need and a 0 for not needed in each position of the field, the parameter block can specify the needed firmware to run the user program.

A program header loaded into system activates the loader. Having partially read the header information the loader calls a firmware location table and begins in turn, the loading of each firmware module specified in the binding information. This firmware location table contains the library storage address of each module. The loader goes to that address, obtains the module, and binds it into the shared memory.

As each micro-program was stored with its indexes oriented to individual program beginning, each firmware program must be reindexed when compiled into shared memory. The loader monitors the storage used by each microprogram and reindexes each microprogram as it is bound into shared memory with respect to its location in shared memory.

When the last specified module has been bound and reindexed the loader may either relinquish control or continue to operate to specify other areas of shared memory storage. Typically, the binding information can first specify the I/O device modules and then processor computational firmware. Having read these instructions and loaded the required microprograms, the loader may then specify buffer storage, scratch pad memory storage and then load the user program before relinquishing control.

A better understanding of the loader's operation may be had from the flow diagram of FIG. 8 taken in conjunction with the following discussion.

The depressing of a load key on the operator's console generates an initiate signal to the loader. The loader then checks the header to read the program name and then begins searching storage disks on which all libraries of information are stored. These disks contain the library of I/O devices, i.e., peripheral controllers, and also a library of computational firmware (algorithms) for the interpreter (processor) itself. If the loader does not locate a file corresponding to the program name it signals an error to the operator. If a file is present, the loader reads the next field in the header which contains the flag word. If this flag word is valid, the loader reads the disk address of the binding information file from the third field of the header. The parameter block containing this binding information is then read. This binding information block uses true bits to signify the need for specific microstrings.

The loader then fetches an address table of all optional controllers and begins addressing and binding the indicated controllers specified by the parameter block into shared memory in the order read. Since all controllers are stored in "library" indexed base relative to zero, the loader reindexes each controller (firmware module) base relative to the memory location of binding After completing the binding of peripheral controller firmware the loader binds editing instructions into memory.

Once the editing capability has been bound a table of disk addresses of processor computational firmware is fetched and the required computational algorithms needed to run the user program are loaded into shared memory behind the peripheral controllers in the same manner as these controllers with reindexing of microstring indexes as is needed.

After this computational firmware is loaded, a table of disk addresses of all optional S-instruction implementation is fetched. With this information available the loader reads S-instruction implementation specifications from the binding information and compiles each routine, in order, behind the computational firmware. This binding operation is performed in the same manner as binding of controllers and computational algorithms above. Reindexing of internal routine flags is also performed as above.

Once this information is bound into memory buffer requirements are read and each buffer space is bound into memory.

Next, scratch pad memory requirements are read from the program parameter block and storage space is reserved for scratch pad memory. If not enough memory is available an error alarm is sounded.

Having completed this binding the loader sets an end pointer for dump. This pointer separates the above described bound areas of shared memory from the as of yet unused portions of the shared memory. The bound portion becomes user-"undumpable" or user-read-only while the unbound portion remains user-dumpable or user-read-write.

After this pointer is set the loader compiles the user object code and relinquishes control to the system.

Figure 9:
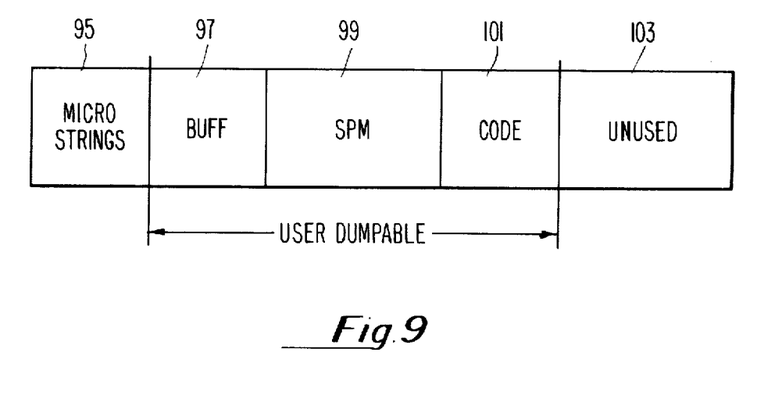
FIG. 9 is a representation of a memory section showing the user dumpable or user-read-writable portion.

However, this end pointer may be specified so that the lower bound for user-dump may include the buffers and scratch pad memory. From FIG. 9 this case may be seen wherein the bound microcode 95 is user-undumpable but buffers 97, scratch pad memory 99 and user object code 101 is user-dumpable. A yet to be used portion 103 remains user-dumpable.

Many different embodiments of this invention could be made without departing from the scope thereof. It is intended, therefore, that all matter contained in the above description be interpreted as illustrative and not in the limiting sense.

What is claimed is:

1. A method for storing both microinstructions and source level instructions in a shared memory of a data processor, comprising the steps of:
   storing a plurality of firmware modules in auxiliary storage outside of the shared memory;
   specifying particular ones of said plurality of firmware modules needed to run a particular program;
   translating said firmware module specifications at load time of said particular program into a set of required firmware modules;
   loading each firmware module in said set of required firmware modules into an area in the shared memory;
   separating said area in the shared memory so loaded from a user dumpable area; and
   loading source level instructions into the shared memory at a location outside said separated area.

2. The method of claim 1 wherein the steps of storing includes:
   labeling each said stored firmware module;
   indexing each said stored firmware module; and
   constructing a table of said stored firmware module labels and indexes.

3. The method of claim 2 wherein the step of specifying includes:
   constructing a table in storage of binding informations referenced to said particular program; and
   heading said particular program with a program name, and the storage address of said binding information for said particular program.

4. The method of claim 3 wherein the step of translating includes:
   locating the binding information in storage for said particular program;
   reading each said firmware module specification in turn; and
   accessing said table of said stored firmware module labels and indexes for addressing each firmware module required.

5. The method of claim 4 wherein the step of loading also includes:
   reindexing each loaded firmware module according to its bound location in said shared memory.

6. A firmware loader for use with a miroprogrammable computer system having a shared memory for storing both firmware modules and user program object code, said system being adapted to receive a program having encoded header information for identifying the beginning of the program and the particular firmware modules required therefor, said loader comprising:
   an auxiliary storage system for storing firmware modules;
   decoder means responsive to the encoded header information for detecting the beginning of a program;
   instruction decoding means responsive to said detecting of said decoder means and to the encoded header information for specifying particular ones of said firmware modulus to be loaded into the shared memory; and firmware binding means controlled by said instruction decoding means for loading from said auxiliary storage system into the shared memory said specified particular ones of said firmware molules.

7. The firmware loader according to claim 6 wherein:

said auxiliary storage system includes means for indexing said firmware modules to their auxiliary storage locations; and said firmware binding means includes means for reindexing said specified particular ones of said firmware modules according to their shared memory storage locations.

* * * * *